United States Patent
Fukunishi (10) Patent No.: US 8,432,560 B2
(45) Date of Patent: Apr. 30, 2013

(54) PRINT PROCESSING SYSTEM, PRINTING PROCESSING METHOD, PRINTING PROCESSING PROGRAM AND STORAGE MEDIUM

(75) Inventor: Shigeki Fukunishi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 537 days.

(21) Appl. No.: 12/724,914

(22) Filed: Mar. 16, 2010

(65) Prior Publication Data

US 2010/0238480 A1  Sep. 23, 2010

(30) Foreign Application Priority Data

Mar. 17, 2009 (JP) .................................. 2009-065070

(51) Int. Cl.
*G06K 15/00* (2006.01)
(52) U.S. Cl.
USPC ........................................ 358/1.14; 358/1.16
(58) Field of Classification Search ...... 726/2; 713/182, 713/183, 184; 358/1.14, 1.15, 1.16, 1.6, 358/1.9
See application file for complete search history.

(56) References Cited

U.S. PATENT DOCUMENTS

| 8,199,339 B2* | 6/2012 | Ihara ............................. 358/1.14 |
| 2007/0022467 A1* | 1/2007 | Filbrich ............................. 726/2 |
| 2009/0161149 A1* | 6/2009 | Noguchi et al. ............. 358/1.15 |
| 2010/0214604 A1* | 8/2010 | Hosono et al. ............... 358/1.15 |

FOREIGN PATENT DOCUMENTS

| JP | 2004-272483 | 9/2004 |
| JP | 2008-059468 | 3/2008 |
| JP | 2008-071196 | 3/2008 |

OTHER PUBLICATIONS

Office Action issued Jan. 29, 2013, in Japanese Patent Application No. 2009-065070, filed Mar. 17, 2009 (3 pages).

* cited by examiner

*Primary Examiner* — Jerome Grant, II
(74) *Attorney, Agent, or Firm* — Oblon, Spivak, McClelland, Maier & Neustadt, L.L.P.

(57) ABSTRACT

A terminal apparatus for preparing a print job based on a document file prepared using an application and transmitting the print job to a printing apparatus is devised. The terminal apparatus includes a verification-use information receiving unit, a storage destination control unit, an information retrieval and attachment unit, and a data transmission unit. The verification-use information receiving unit receives verification information to be attached to the print job. The storage destination control unit controls a storage destination of the verification information received by the verification-use information receiving unit. The information retrieval and attachment unit reads out the verification information from the storage destination and to attach the read-out verification information to the print job. The data transmission unit transmits the print job, to which the verification information is attached by the information retrieval and attachment unit, to the printing apparatus.

12 Claims, 8 Drawing Sheets

PRINT PROCESSING SYSTEM, PRINTING PROCESSING METHOD, PRINTING PROCESSING PROGRAM AND STORAGE MEDIUM

CROSS-REFERENCE TO RELATED APPLICATIONS

This application claims priority to Japanese Patent Application No. 2009-065070, filed on Mar. 17, 2009 in the Japan Patent Office, which is hereby incorporated by reference herein in its entirety.

BACKGROUND OF THE INVENTION

1. Field of the Invention

The present invention relates to a print processing system for generating print job data, a printing processing method, a printing processing program, and a storage medium.

2. Description of the Background Art

Printing apparatuses such as printers for outputting printed matter may use a secured printing function when outputting printed matter to ensure that only the person who generates the print job can obtain the printed matter. In this case, the person who generates the print job and person who receives the print job are the same person. This method can ensure that some other person does not take the printed matter from the printing apparatus.

For example, JP-2004-272483-A discloses one method for such secured printing function, which is used as below. In a given user environment, a computer, such as a personal computer, is connected to a printing apparatus, such as a printer having a secured printing function. When a user (i.e., person who generates a print job) prepares or generates print job data, the person who generates the print job inputs a user name and a password via the computer, and then the print job data to which such user information is attached is transmitted to the printing apparatus. The printing apparatus does not start to print the print job data immediately upon receiving the print job data, but stores the print job data in the printing apparatus. The printing apparatus starts a printing operation of the print job data only if the person who receives the print job inputs the same user name and password to the printing apparatus that was input by person who generates the print job via the computer, in which the person who generates the print job acts as the person who receives the print job. As such, if the person who receives the print job inputs a user name and a password to the printing apparatus that matches the user name and password attached to the print job data prepared for printing, the printing apparatus starts a printing operation for the print job data.

Further, a job acceptance verification function may be employed for printing apparatuses to prevent unauthorized access usage. The job acceptance verification function is used to determine which users can access a given printing apparatus and which user cannot access the printing apparatus. Specifically, when a user who is registered in the printing apparatus in advance transmits print job data to the printing apparatus, the printing apparatus accepts such print job data. But when another user who is not registered in the printing apparatus transmits print job data to the printing apparatus, the printing apparatus does not accept such job data.

When a user (i.e., person who generates a print job) prepares or generates print job data, the person who generates the print job inputs a user name and a password via the computer, and then the print job data to which such user information is attached is transmitted to the printing apparatus. The printing apparatus accepts the print job data only when the user name and password attached to the print job data match a user name and a password registered in the printing apparatus in advance. Otherwise, the printing apparatus does not accept the print job data and cancels the print job if the user name and the password attached to the print job data does not match any registered user name and password, or when no user name and password are attached to the print job data.

The secured printing function and job acceptance verification function described above may be used simultaneously to ensure that the person who generates the print job and the person who receives the print job are one and the same person, and to prevent unauthorized access to the printing apparatus.

However, in the conventional method described above, a user name and a password is input for the secured printing function as one single set, and a user name and a password is input for the job acceptance verification function as another single set, which means that two sets of user names and passwords need to be input when preparing one print job data and also when starting a printing operation. Such redundant input is inconvenient.

Further, if the same user name and password is used for both the secured printing function and for the job acceptance verification function, the following problems may arise.

Figure 1:
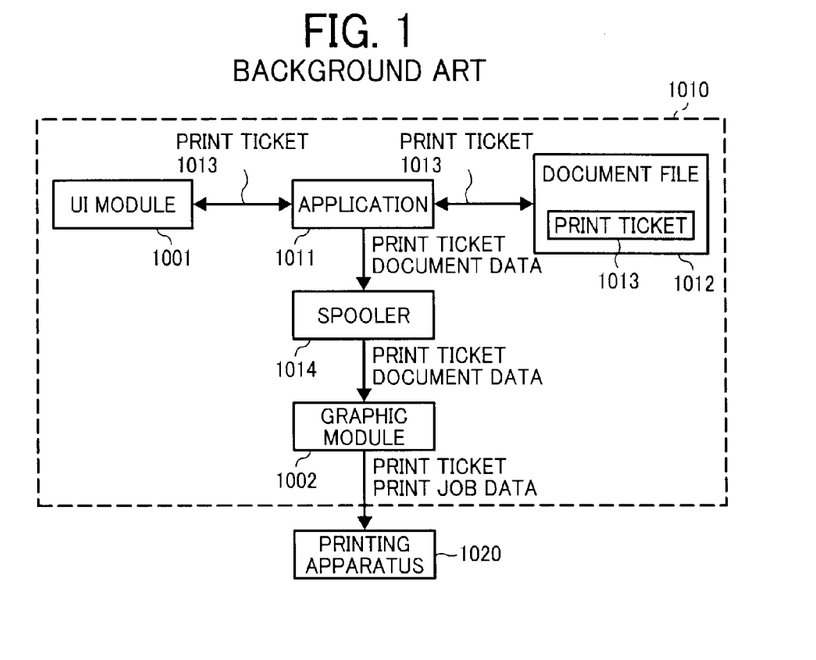
FIG. 1 illustrates a conventional printing architecture of operating system for a computer.

FIG. 1 illustrates schematically the configuration of a printing architecture used for one operating system for conventional computers such as personal computers. As illustrated in FIG. 1, a printer driver 1010 may include a user interface module 1001 (UI module 1001), a graphic module 1002, an application 1011, and a spooler 1014, for example. The printer driver 1010 may be connected to a printing apparatus 1020. The UI module 1001 may provide a print-condition setting screen. A user may use the print-condition setting screen to set print-condition settings such as parameters for generating print job data, parameters to be attached to the print job data, or the like. The application 1011 may prepare document data. The graphic module 1002 may refer to the print-condition settings set at the UI module 1001 while receiving the document data prepared by the application 1011 via the spooler 1014, and then generate print job data from the received document data. Such graphic module 1002 may be referred as a "filter."

In the printing architecture configured as described above, the UI module 1001 may store the print-condition settings set by the user as a Print Ticket 1013, and transmit the Print Ticket 1013 to the application 1011. In some cases, the application 1011 may embed the Print Ticket 1013, transmitted from the UI module 1001, in a document file 1012, and then store the document file 1012 embedded with the Print Ticket 1013.

If such application 1011 is included in the printing architecture, a printing operation may be conducted as follows. For example, one printing operation is conducted by opening the document file 1012 embedded with the Print Ticket 1013 without opening the print-condition setting screen. In such a case, the print-condition setting stored in the Print Ticket 1013, embedded in the document file 1012, is transmitted to the graphic module 1002 as is. Such print-condition setting, stored in the Print Ticket 1013, may be output to the printing apparatus 1020 with the print job data.

In the printing architecture configured as described above, one document may be handled by different users such as user A and user B as follows. At first, a user A prepares one document, and opens the print-condition setting screen to input a user name and a password (set for user A) for the job acceptance verification function, by which one printing operation can be conducted for the one document. After conducting printing operation, the user A may store the document used for printing operation as the document file 1012, and may transmit the document file 1012 to an apparatus belonging to a user B. Then, the user B may conduct another printing operation by opening the document file 1012 without opening the print-condition setting screen. As described above, the document file 1012 may be embedded with the Print Ticket 1013, storing a user name and a password (i.e., information of user A) used for the job acceptance verification function. In such another printing operation, the user B does conduct another printing operation to output a printed matter, but such printed matter is output with the user name and password set for user A for the job acceptance verification function. In such case, unauthorized access usage of the printing apparatus 1020 cannot be prevented, which means the job acceptance verification function does not work properly.

On the one hand, a user name and a password used for the secured printing function may be stored in the Print Ticket 1013, but such configuration may not cause problems. As with the job acceptance verification function, the user A prepares one document, and opens the print-condition setting screen to input a user name and a password (set for user A) for the secured printing function, by which one printing operation can be conducted for the one document. After conducting printing operation, the user A may store the document used for printing operation as the document file 1012, and transmit the document file 1012 to the user B. Then, the user B may instruct another printing operation by opening the document file 1012 without opening the print-condition setting screen. However, the user B cannot conduct another printing operation for the print job data because the user B does not know the user name and password of user A. Accordingly, the purpose of secured printing function to ensure that same person acts as both the person who generates the print job and the person who receives the print job can be maintained.

Figure 2:
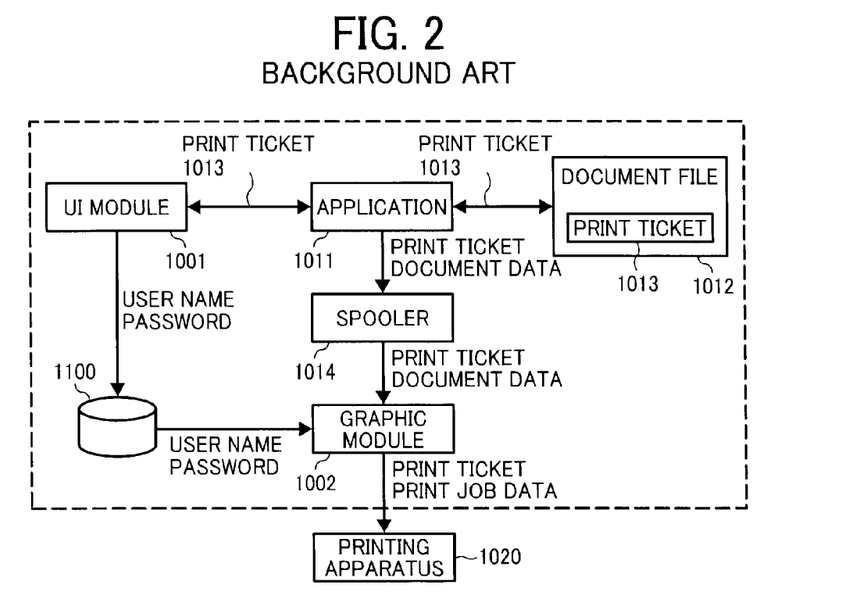
FIG. 2 illustrates another conventional printing architecture of operating system for a computer.

The above-described problems for job acceptance verification function may be prevented by storing a user name and a password usable for the job acceptance verification function set by the UI module 1001 to a storage area other than the Print Ticket 1013. For example, the user name and password may be stored in a storage area 1100 shown in FIG. 2. FIG. 2 illustrates schematically the configuration of a printing architecture of another operating system for conventional computers such as personal computers. In a configuration of FIG. 2, a user name and a password are not stored in the Print Ticket 1013. In such configuration, the user A can prepare the document file 1012 and open the document file 1012 for printing operation by using a user name and a password set for the user A. If the user B tries to conduct a printing operation using the document file 1012 without opening the print-condition setting screen, the user name and password set for the user A for the job acceptance verification function cannot be output to the printing apparatus 1020. Accordingly, the purpose of job acceptance verification function to prevent unauthorized access usage to the printing apparatus 1020 can be achieved.

Figure 3:
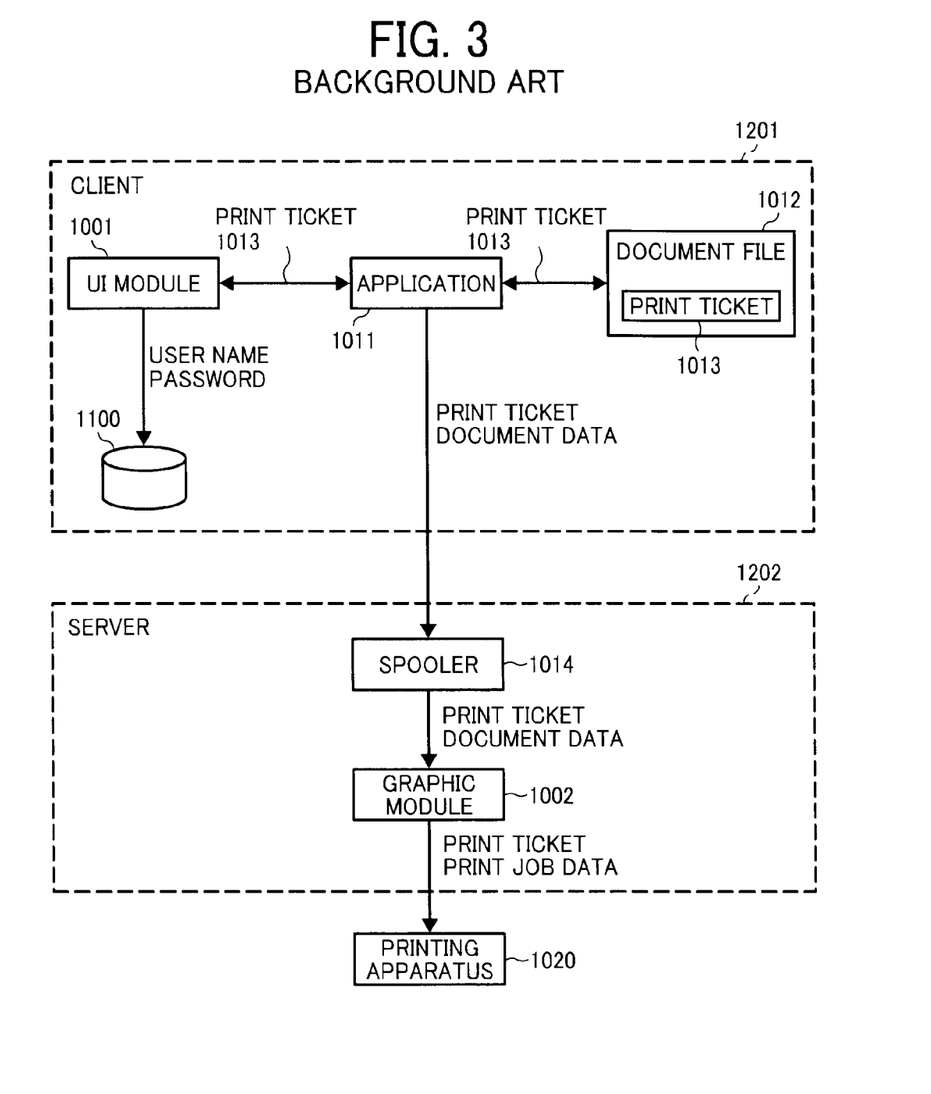
FIG. 3 illustrates another conventional printing architecture modified from the conventional printing architecture of FIG. 2, in which the printing architecture is employed for a client/server configuration.

However, in the printing architecture of FIG. 2, the graphic module 1002 may need to read out a user name and a password from the storage area 1100, which is something other than the Print Ticket 1013, to generate print job data for printing. FIG. 3 illustrates schematically the configuration of one aspect of the printing architecture of FIG. 2, in which some inconvenience may arise. As illustrated in FIG. 3, a client/server configuration may be devised for the printing architecture, in which the UI module 1001 may be disposed in a client terminal 1201 and the graphic module 1002 may be disposed in a server 1202, for example. In such a configuration, the graphic module 1002 cannot read out a user name and a password stored in the storage 1100 by the UI module 1001, and therefore the secured printing function cannot be used.

As such, if the same user name and the same password are used for both the secured printing function and the job acceptance verification function, usability of printing architecture may be enhanced by storing the same user name and the same password in a storage area other than the Print Ticket 1013. However, such method may cause problems with the secured printing function used in the client/server configuration, for example. That is, if the same user name and the same password for the secured printing function and job acceptance verification function are stored in the Print Ticket 1013, the job acceptance verification function which prevents unauthorized access usage to the printing apparatus 1020 may not be implemented.

SUMMARY

In one aspect of the invention, a terminal apparatus, for preparing a print job based on a document file prepared using an application and transmitting the print job to a printing apparatus, is devised. The terminal apparatus includes a verification-use information receiving unit, a storage destination control unit, an information retrieval and attachment unit, and a data transmission unit. The verification-use information receiving unit receives verification information to be attached to the print job. The storage destination control unit controls a storage destination of the verification information received by the verification-use information receiving unit. The information retrieval and attachment unit reads out the verification information from the storage destination and to attach the read-out verification information to the print job. The data transmission unit transmits the print job, to which the verification information is attached by the information retrieval and attachment unit, to the printing apparatus.

In another aspect of the invention, a print processing system, including a terminal apparatus to prepare a print job based on a document file prepared using an application and a printing apparatus communicably connected to the terminal apparatus for conducting a printing process for the print job, is devised. The terminal apparatus includes a verification-use information receiving unit, a storage destination control unit, an information retrieval and attachment unit, and a data transmission unit. The verification-use information receiving unit receives verification information to be attached to the print job. The storage destination control unit controls a storage destination of the verification information received by the verification-use information receiving unit. The information retrieval and attachment unit reads out the verification information from the storage destination and to attach the read-out verification information to the print job. The data transmission unit transmits the print job, to which the verification information is attached by the information retrieval and attachment unit, to the printing apparatus. The printing apparatus includes a job receiving unit and a processing control unit. The job receiving unit receives the print job from the data transmission unit of terminal apparatus. The processing control unit controls at least one of job acceptance verification processing and secured printing processing by using the verification information attached to the print job by the information retrieval and attachment unit and received by the job receiving unit.

In another aspect of the invention, a method of processing print job in a print processing system, having a terminal apparatus to prepare a print job based on a document file prepared by using an application and a printing apparatus communicably connected to the terminal apparatus to conduct a printing process for the print job, is devised. The method includes the steps of receiving, controlling, reading out, attaching, transmitting, and controlling. The receiving step receives verification information to be attached to the print job using the terminal apparatus. The controlling step controls a storage destination for storing the verification information received at the receiving step using the terminal apparatus. The reading out step reads out the verification information from the storage destination using the terminal apparatus. The attaching step attaches the read-out verification information to the print job using the terminal apparatus. The transmitting step transmits the print job, to which the verification information is attached, from the terminal apparatus to the printing apparatus. The controlling step controls at least one of job acceptance verification processing and secured printing processing using the printing apparatus by using the verification information received by the terminal apparatus in the receiving step and attached to the print job by the terminal apparatus in the attaching step.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, Operations, elements, and/or components, but do not preclude the presence or addition of one or more other features, integers, steps, Operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner.

Referring now to the drawings, a print processing system, printing processing method, a printing processing program, and a storage medium of printing processing program according to an example embodiment are described hereinafter.

Figure 4:
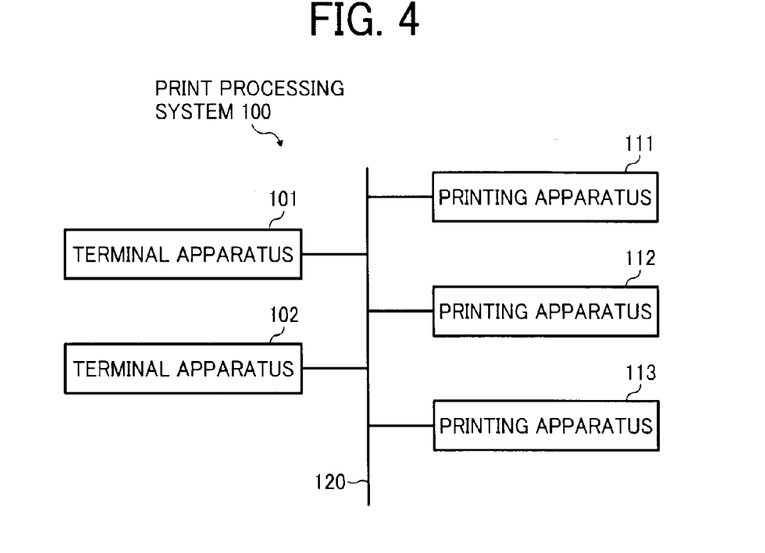
FIG. 4 illustrates a schematic configuration of a print processing system according to an example embodiment.

A description is now given to a print processing system according to an example embodiment with reference to FIG. 4. FIG. 4 illustrates a schematic configuration of a print processing system 100. The print processing system 100 may be configured with terminal apparatuses 101 and 102, printing apparatuses 111, 112, and 113, which are connected with other via a network 120. In FIG. 4, the print processing system 100 includes a plurality of apparatuses such as terminal apparatuses 101 and 102, and printing apparatuses 111, 112, and 113, but the print processing system 100 may not need to include a plurality of apparatuses. The print processing system 100 may include one or more terminal apparatuses and one or more printing apparatuses.

Figure 5:
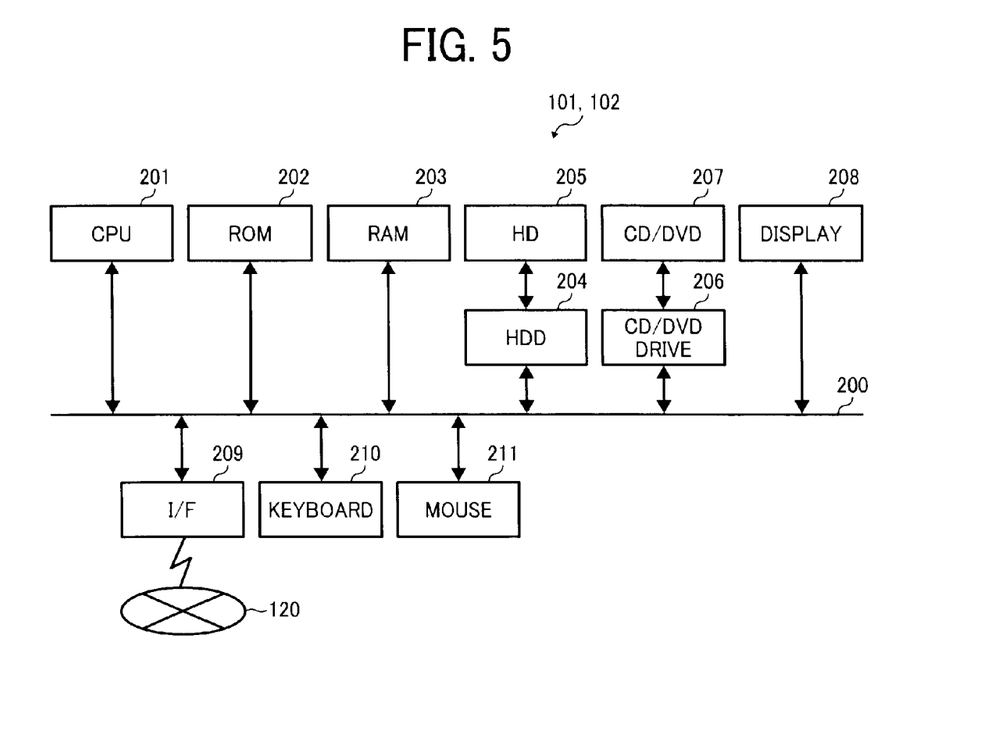
FIG. 5 illustrates an example block diagram of hardware configuration of terminal apparatus.

A description is given to a hardware configuration of the terminal apparatuses 101 and 102 with reference to FIG. 5. FIG. 5 illustrates a block diagram of example hardware configuration of terminal apparatuses 101 and 102. As illustrated in FIG. 5, each of the terminal apparatuses 101 and 102 may include a central processing unit (CPU) 201, a read only memory (ROM) 202, a random access memory (RAM) 203, a hard disc drive (HDD) 204, a hard disc (HD) 205, a compact disc/digital versatile disc (CD/DVD) drive 206, a CD/DVD 207, a display 208, an interface (I/F) 209, a keyboard 210, and a mouse 211, wherein such units are connected with each other via a bus 200, for example.

The CPU 201 controls the terminal apparatuses 101 and 102 as a whole. The ROM 202 stores control programs and application programs. The RAM 203 may be used as a working memory area of the CPU 201. The HDD 204 controls data reading/writing to the HD 205 under a control command of the CPU 201. The HD 205 stores data written under a control of HDD 204. The CD/DVD drive 206 controls data reading/writing to the CD/DVD 207 under a control command of the CPU 201.

The CD/DVD 207, which stores data written under a control of CD/DVD drive 206, may be detachable (or removable) storage medium. Such detachable storage medium may include the CD/DVD 207, a magneto optical disc (MO), a flexible disc (FD), a memory card, or the like. The HDD 204 and CD/DVD 207 may store data such as for example document file and Print Ticket, to be described later.

The display 208 displays data such as document data, image data, function information, or the like. The display 208 may be a thin film transistor (TFT), a liquid crystal display (LCD), a cathode ray tube (CRT), a plasma display, or the like, for example. Further, the display 208 may display data a print-condition setting screen set by a UI module, to be described later.

The I/F 209 functions as an interface for the terminal apparatuses 101 and 102. For example, the terminal apparatuses 101 and 102 can be connected to a network 120 such as a communication line (e.g., telephone line), the Internet, and an in-house network via the I/F 209. Further, the I/F 209 controls data input/output between the terminal apparatuses 101, 102 and the printing apparatuses 111, 112, 113 via the network 120. Specifically, the I/F 209 may control a print job output to the printing apparatuses 111, 112, 113 from a graphic module, to be described later, for example. The keyboard 210 and the mouse 211 are used to input and set data.

The printing apparatuses 111, 112, and 113 may employ a hardware configuration, which is similar to a hardware configuration of the terminal apparatuses 101 and 102. Accordingly, description of the hardware configuration of printing apparatus 111, 112, and 113 is omitted.

Figure 6:
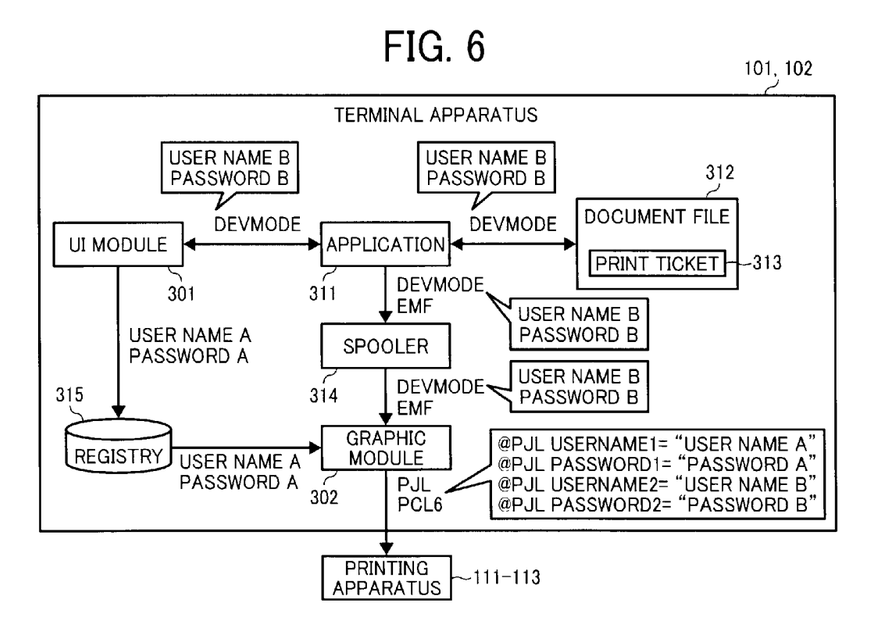
FIG. 6 illustrates an example functional configuration of terminal apparatus according to an example embodiment.

A description is given to a functional configuration of the terminal apparatuses 101 and 102 with reference to FIG. 6. FIG. 6 illustrates a functional configuration of the terminal apparatuses 101 and 102. FIG. 6 illustrates one example case that the terminal apparatuses 101 and 102 use a printer driver for Microsoft Windows (registered trademark), which uses enhanced metafile (EMF) spool for printer control language 6 (PCL6).

The printer driver may include a UI module 301, and a graphic module 302, which may be referred as a "filter". The UI module 301 may provide a print-condition setting screen, by which a user can set print-condition settings such as for example parameters required for generating job data such as print job data, and parameters to be attached to job data such as print job data. Further, the UI module 301 may store such print-condition settings set by a user as Print Ticket 313. The print job data may be referred to as print job. As such, the UI module 301 may function as a reception unit and a storage destination control unit, and may store a user name and a password set by a user as first verification information in the Print Ticket 313. Specifically, the Print Ticket 313 may use a device mode (DEVMODE) structure set for Windows (registered trademark), for example. Then, the UI module 301 transmits the Print Ticket 313 to an application 311. Further, a user name and a password may be stored in a registry 315 as similar to the Print Ticket 313 (DEVMODE structure).

Figure 7:
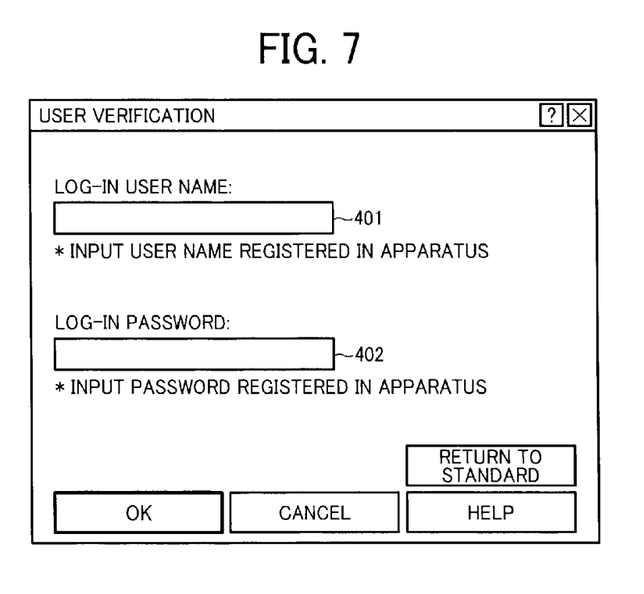
FIG. 7 illustrates a print-condition setting screen of user interface (UI) module, which displays contents.

FIG. 7 illustrates an example display contents displayable on a print-condition setting screen set by the UI module 301, in which a screen used for user verification is illustrated. As illustrated in FIG. 7, the print-condition setting screen may display an information input screen including an input section 401 for inputting a user name and an input section 402 for inputting a password, for example. When a user inputs a user name and a password by operating the information input screen, the input user name and password may be stored both in the Print Ticket 313 and the registry 315. As such, the UI module 301 can be used as a storage destination control unit, which controls a storage destination for storing verification information. For example, the UI module 301 used as storage destination control unit may store verification information concurrently in the registry 315 used as a storage region readable by the graphic module 302, and in a print ticket includable in a document file. Further, the UI module 301 can be used as a verification-use information receiving unit to receive verification information to be attached to print job data.

Figure 8:
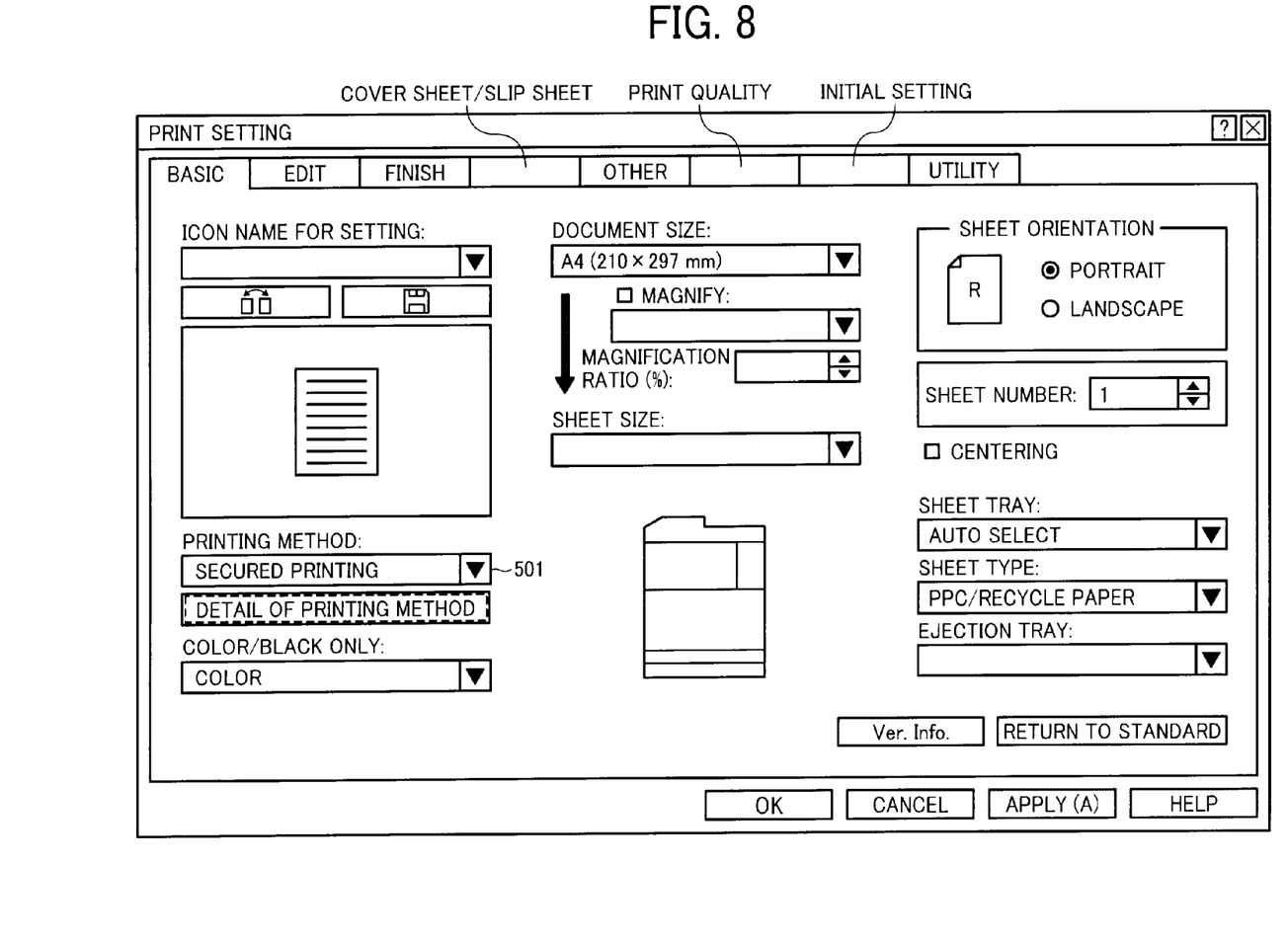
FIG. 8 illustrates a print-condition setting screen which displays other contents.

Further, FIG. 8 illustrates another display contents displayable on the print-condition setting screen. As illustrated in FIG. 8, the print-condition setting screen may display an item setting section 501, by which printing methods can be selected or switched among a plurality of methods, for example. A user can operate the item setting section 501 to switch a printing method from a normal printing to a secured printing function or vice versa, for example. Further, the UI module 301 may be used to receive information for implementing a job acceptance verification function from a user, in which the user can determine whether information (such as user name and password) for implementing a job acceptance verification function is to be attached or not to a print job data. As such, the UI module 301 can be used as a function designation unit to designate at least one of an job-acceptance function and secured printing function, in which the UI module 301 may function as a verification-use information receiving unit to receive verification information to be attached to print job data.

The application 311 (see FIG. 6) may store a prepared document as a document file 312. Further, the application 311 may embed the Print Ticket 313, transmitted from the UI module 301, in the document file 312, and then store the document file 312. As such, the application 311 adds the Print Ticket 313 to the document file 312.

When a print-condition setting for the document file 312 is set by the UI module 301, the application 311 transmits data of the stored document file 312 embedded with the Print Ticket 313 to a spooler 314. Hereinafter, the data of stored document file 312 may be referred to as "document data," as required. When enhanced metafile (EMF) spool is employed for spooling architecture, the document data may be prepared using EMF format.

The spooler 314 may store the document data embedded with the Print Ticket 313 temporary. Then, the document data and Print Ticket 313 temporary stored in the spooler 314 are sequentially transmitted to the graphic module 302.

The graphic module 302 may prepare or generate a print job data from the document data by referring the print-condition setting set by the UI module 301. For example, the graphic module 302 converts EMF-format document data to PCL6-format data to prepare print job data.

The graphic module 302 may read out one set of user name and password corresponding to the print job data from the registry 315 and attach such user name and password as @PJL/USERNAME 1 and @PJL/PASSWORD 1 to the print job data, for example, in which user name A/password A may be used as verification information used for job acceptance verification function (or job acceptance verification processing), for example. (The graphic module 302 can access information in the registry 315 because the graphic module 302 and the registry 315 can be designed to communicate each other reliably in printing architecture set for printer drivers. For example, even if a printing architecture employs a client/server configuration, in which the registry 315 may be set in the client and the graphic module 302 may be set in the server, the graphic module 302 can communicate with the registry 315 reliably.) Further, the graphic module 302 may read out other one set of user name and password corresponding to the print job data from the Print Ticket 313 having DEVMODE structure, and attach such user name and password as @PJL/USERNAME 2 and @PJL/PASSWORD 2 to the print job data, for example, in which user name B/password B may be used as verification information used for secured printing function (or secured printing processing), for example. As such, the graphic module 302 may function as an information retrieval and attachment unit, which retrieves and attaches verification information to print job data. Such verification information used for job acceptance verification function and verification information used for secured printing function may be referred to as "first verification information," wherein the first verification information may be input via the UI module 301 of the terminal apparatuses 101, 102 by a user or the like as above described. The PJL of @PJL/USERNAME 1, @PJL/PASSWORD 1, @PJL/USERNAME 2, and @PJL/PASSWORD 2 means printer job language (PJL).

The graphic module 302 transmits the print job data attached with @PJL/USERNAME 1, @PJL/PASSWORD 1, @PJL/USERNAME 2, and @PJL/PASSWORD 2 to one or more printing apparatuses (111, 112, 113). As such, the graphic module 302 may function as a data transmission unit.

When a printing operation is conducted without using the secured printing function but with a normal printing function, the graphic module 302 does not read out a user name and a password (e.g., user name B and password B) from the Print Ticket 313, and does not attach @PJL/USERNAME 2 and @PJL/PASSWORD 2 to the print job data. Accordingly, the graphic module 302 may transmit the print job data attached with only one set of data (i.e., @PJL/USERNAME 1 and @PJL/PASSWORD 1) to the printing apparatus. In an example embodiment, a user name and a password (e.g., user name B and password B) stored in the Print Ticket 313 may be used as verification information for secured printing function, for example. It should be noted that user name A/password A, user name B/password B or the like indicates just examples of user name/password in this specification.

In FIG. 6, two sets of user name/password are used, in which user name A/password A stored in the registry 315 and user name B/password B stored in the Print Ticket 313 may be set as different user names and passwords. But such user names and passwords may not need to be different user names and passwords. For example, the user name A/password A and the user name B/password B may be set as identical one. As such, the system configuration according to example embodiment can be applied to one set of user name and password.

Further, when a user does not use the secured printing function, a user attaches only job acceptance verification function to the print job data using the UI module 301, in which a user name and a password is stored as job acceptance verification information only in the registry 315. As such, the UI module 301 can be used as a storage destination control unit to control a storage destination used for storing verification information. For example, given verification information can be stored any one of the registry 315 and the Print ticket 313, or both of the registry 315 and the Print ticket 313, for example. When the secured printing function is not selected and not used, the user name 1 and password 1 may be stored only in the registry 315 as job acceptance verification information, and the graphic module 302 attaches only one set of @PJL/USERNAME 1 and @PJL/PASSWORD 1 to print job data to be transmitted to the printing apparatuses 111, 112, 113.

Figure 9:
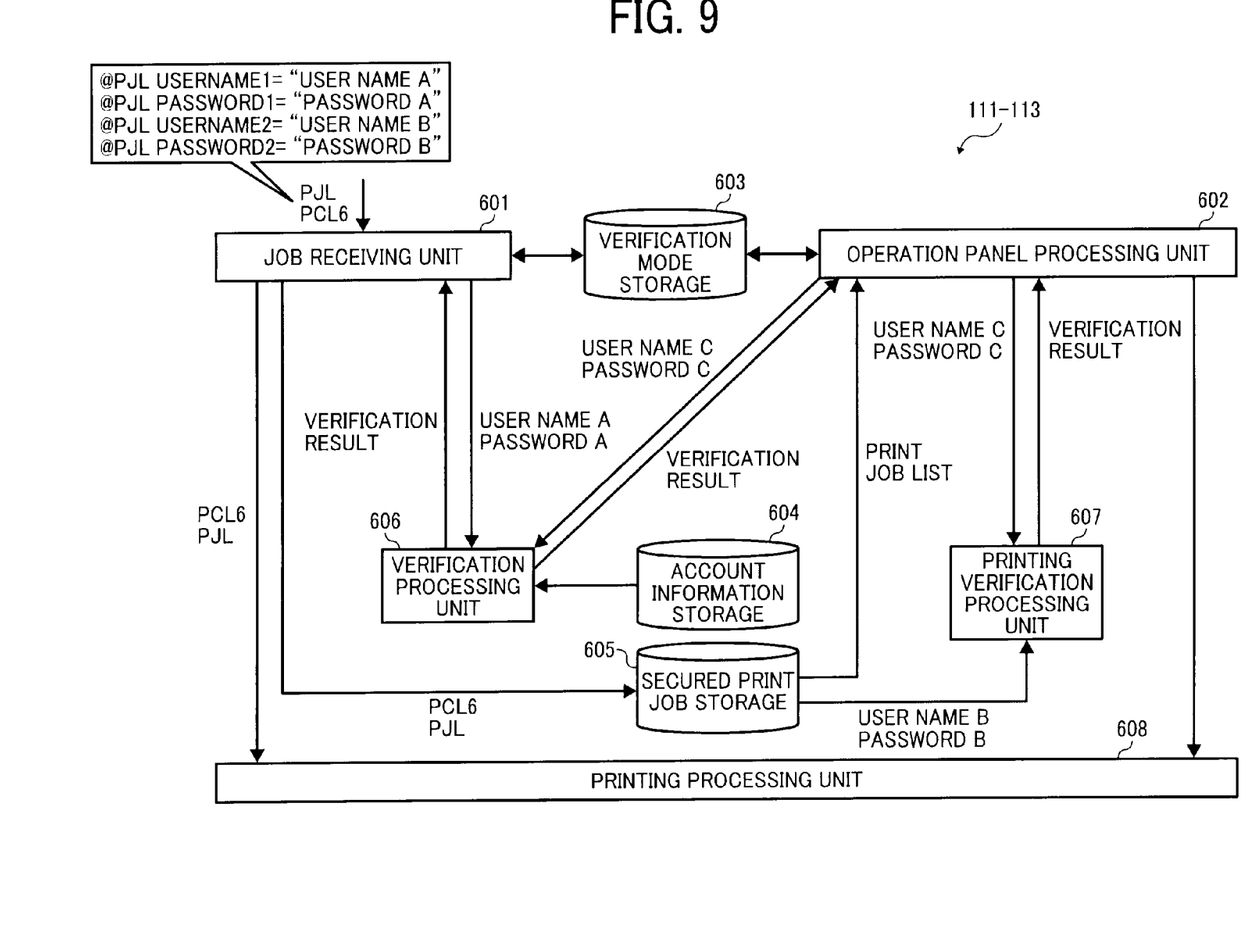
FIG. 9 illustrates a functional configuration of printing apparatus.

A description is given to a functional configuration of the printing apparatuses 111, 112, 113 with reference to FIG. 9, which illustrates a functional configuration of printing apparatus. Each of the printing apparatuses 111, 112, 113 may include a job receiving unit 601, an operation panel processing unit 602, a acceptance verification mode storage 603, an account information storage 604, a secured print job storage 605, a verification processing unit 606, a printing verification processing unit 607, and a printing processing unit 608.

The job receiving unit 601 (to be described later in detail) may receive the PCL6-format print job data, generated by the terminal apparatuses 101 and 102. As such, the job receiving unit 601 may function as a job receiving unit to receive print job data from a terminal apparatus.

The operation panel processing unit 602 (to be described later in detail) may receive a printing request from a person who receives the print job. Further, the operation panel processing unit 602 may receive a user name and a password as log-on information from the person who receives the print job, in which a user inputs a user name and a password using an operation panel when to conduct a printing operation using the printing apparatus 111-113. For example, the user inputs user name C and password C as "third verification information," wherein the third verification information is verification information input to the printing apparatus 111-113 via the operation panel processing unit 602. In one case, a user may walk to the printing apparatus and inputs his or her user name and password to output print job data as printed sheets. As such, The operation panel processing unit 602 may function as a print information receiving unit.

The acceptance verification mode storage 603 may store information whether a job acceptance verification processing is to be conducted. For example, if the acceptance verification mode storage 603 stores information that the job acceptance verification processing is to be conducted, a job acceptance verification function is activated. When the job acceptance verification function is activated, the acceptance verification mode storage 603 may request the operation panel processing unit 602 to input a user name and a password, for example.

Figure 10:
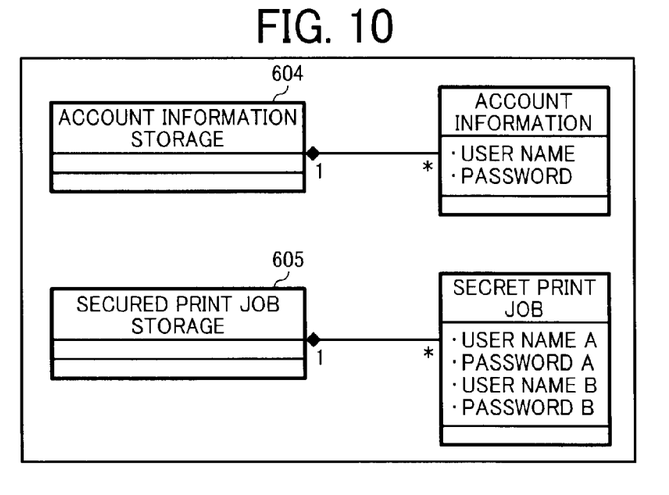
FIG. 10 illustrates account information stored in an account information storage and secured print job stored in a secured print job storage.

FIG. 10 illustrates the account information storage 604 and the secured print job storage 605, wherein the account information storage 604 stores account information, and the secured print job storage 605 stores secured print job. As illustrated in FIG. 10, the account information storage 604 may store account information, and each of account information may include one set of a user name and a password as "second verification information," wherein the second verification information is set and stored in the account information storage 604 at a given time such as when a terminal apparatus and a printing apparatus are connected with each other for the first time, for example. As such, the account information storage 604 may be used as a storage unit for storing account information.

Further, as illustrated in FIG. 10, the secured print job storage 605 may store secured print job, and each of secured print jobs may be attached with a user name/password such as user name A/password A, user name B/password B, for example. As such, the secured print job storage 605 may be used as a job storage unit for storing print job data.

If the acceptance verification mode storage 603 stores information that job acceptance verification processing is to be conducted, the verification processing unit 606 may determine whether the account information storage 604 has account information that can be matched to a set of user name and password transmitted from the job receiving unit 601 or the operation panel processing unit 602. For example, the job receiving unit 601 transmits a set of user name A and password A attached to the print job data to the verification processing unit 606, and the verification processing unit 606 refers to the account information storage 604 whether the user name A and password A is already set in the account information storage 604; or the operation panel processing unit 602 transmits a set of user name C and password C to the print job data to the verification processing unit 606, and the verification processing unit 606 refers to the account information storage 604 whether the user name C and password C is already set in the account information storage 604. If the verification processing unit 606 determines that the account information has a user name and a password matched to the user name and password transmitted from the job receiving unit 601 or the operation panel processing unit 602, the verification processing unit 606 reports a verification result that acceptance verification has succeeded to the job receiving unit 601 or the operation panel processing unit 602. If the verification processing unit 606 determines that the account information does not have a user name and a password matched to the user name and password transmitted from the job receiving unit 601 or the operation panel processing unit 602, the verification processing unit 606 reports a verification result that acceptance verification has not succeeded (or has failed) to the job receiving unit 601 or the operation panel processing unit 602. As such, the verification processing unit 606 may function as a job acceptance verification unit, which may be referred to as processing control unit to control a job acceptance verification processing based on verification information such as user name and password.

The printing verification processing unit 607 may determine whether the user name C/password C transmitted from the operation panel processing unit 602 matches the user name B/password B stored in the secured print job storage 605. If the printing verification processing unit 607 determines that the user name C/password C matches the user name B/password B, the printing verification processing unit 607 reports a verification result that verification has succeeded to the operation panel processing unit 602.

If the printing verification processing unit 607 determines that the user name C/password C does not match the user name B/password B, the printing verification processing unit 607 reports a verification result that verification has not succeeded (or has failed) to the operation panel processing unit 602. As such, the printing verification processing unit 607 may function as a printing verification unit, which may be referred to as processing control unit to control a secured printing processing based on verification information such as user name and password.

If job acceptance verification function information is attached to the print job data by the terminal apparatuses 101 and 102, the printing verification processing unit 607 may determine whether the user name C/password C, input and transmitted from the operation panel processing unit 602, matches the user name A/password A stored in the secured print job storage 605.

When the printing verification processing unit 607 determines that the user name C/password C matches the user name /password attached to the print job data, the printing verification processing unit 607 reports a verification result that verification has succeeded to the operation panel processing unit 602. Then, the printing processing unit 608 may conduct a printing processing for the print job data received from the job receiving unit 601. The printing processing unit 608 may conduct a secured print job verified by the printing verification processing unit 607. As such, the printing processing unit 608 may function as a print processing unit.

Figure 11:
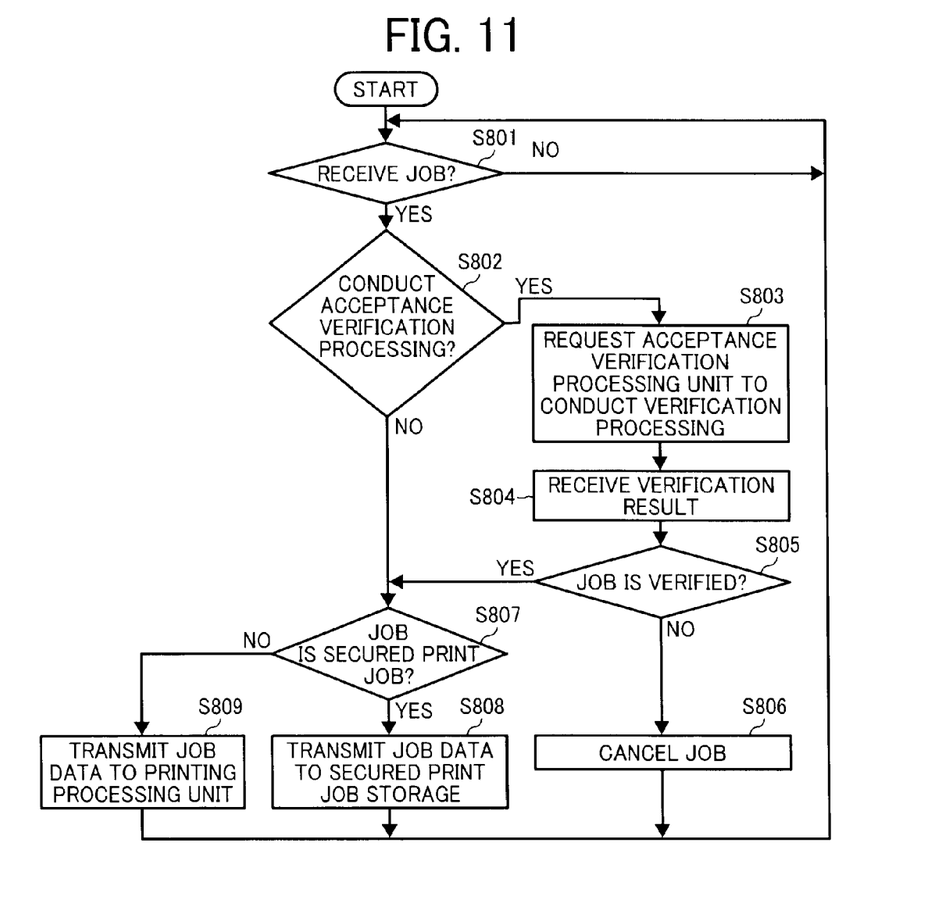
FIG. 11 illustrates a flowchart for processes conductable by using a job receiving unit of a printing apparatus.

A description is now given to processes in the job receiving unit 601 with reference FIG. 11, which illustrates a flowchart for processes conductable by using the job receiving unit 601 of the printing apparatuses 111-113. As illustrated in FIG. 11, the job receiving unit 601 may wait a reception of print job data from the terminal apparatuses 101 and 102 (step S801). If the job receiving unit 601 does not receive a print job data from the terminal apparatuses 101-102 (step S801: NO), the job receiving unit 601 maintains a waiting status until a print job data is received from the terminal apparatuses 101-102, wherein such waiting status may be referred to as "NO" loop for step S801. When the job receiving unit 601 receives a print job data (step S801: YES), it is determined whether a job acceptance verification function is to be conducted (step S802). In step S802, it is determined whether the acceptance verification mode storage 603 stores information which instructs an job acceptance verification processing is to be conducted.

If it is determined that the job acceptance verification function is to be conducted (step S802: YES), the job receiving unit 601 requests the verification processing unit 606 to conduct the job acceptance verification processing (step S803). When the terminal apparatuses 101 transmits the print job data, the print job data may attached with a user name and password used as verification information. For example, the print job data may be attached with a user name A and password A. In step S803, the job receiving unit 601 requests the verification processing unit 606 to check the user name A and password A attached to the print job data which is received at step S801. The verification processing unit 606 determines whether account information stored in the account information storage 604 includes a set of user name and password that can be matched to the set of user name A and password A. If it is determined that the user name and password matched to the set of user name A and password A exists in the account information storage 604, the verification processing unit 606 reports a verification result that verification has succeeded to the job receiving unit 601. If it is determined that the user name and password matched to the set of user name A and password A does not exist in the account information storage 604, the verification processing unit 606 reports a verification result that verification has not succeeded (or has failed) to the job receiving unit 601.

The job data receiving unit 601 may receive the verification result from the verification processing unit 606 (step S804). Based on the verification result, the job receiving unit 601 determines whether the print job data received at step S801 is verified (step S805). If the print job data is not verified (step S805: NO), the print job data received at step S801 is cancelled (step S806), and then the process returns to step S801. Then, another job acceptance verification processing may be conducted repeatedly.

If it is determined that the job acceptance verification function is not conducted at step S802 (step S802: NO), the process goes to step S807. At step S807, it is determined whether the print job data received at step S801 is a secured print job. As illustrated, in FIG. 11, if the print job data is verified (step S805: YES), the process goes to step S807. In step S807, it is determined whether the print job data received at step S801 is the secured print job. At step S807, it is determined whether the print job data is attached with the user name B and password B, for example. If the user name B and password B is attached, it is determined that the print job data is the secured print job.

If it is determined that the print job data is the secured print job at step S807 (step S807: YES), the print job data is transmitted to the secured print job storage 605 (step S808), and the process returns to step S801. Then, another job acceptance verification processing may be conducted repeatedly.

Further, if it is determined that the print job data is not the secured print job at step S807 (step S807: NO), the print job data is transmitted to the printing processing unit 608 (step S809), and the process returns to step S801. Then, another job acceptance verification processing may be conducted repeatedly. When the printing processing unit 608 receives the print job data from the job receiving unit 601, the print job data may be printed on a recording medium.

Figure 12:
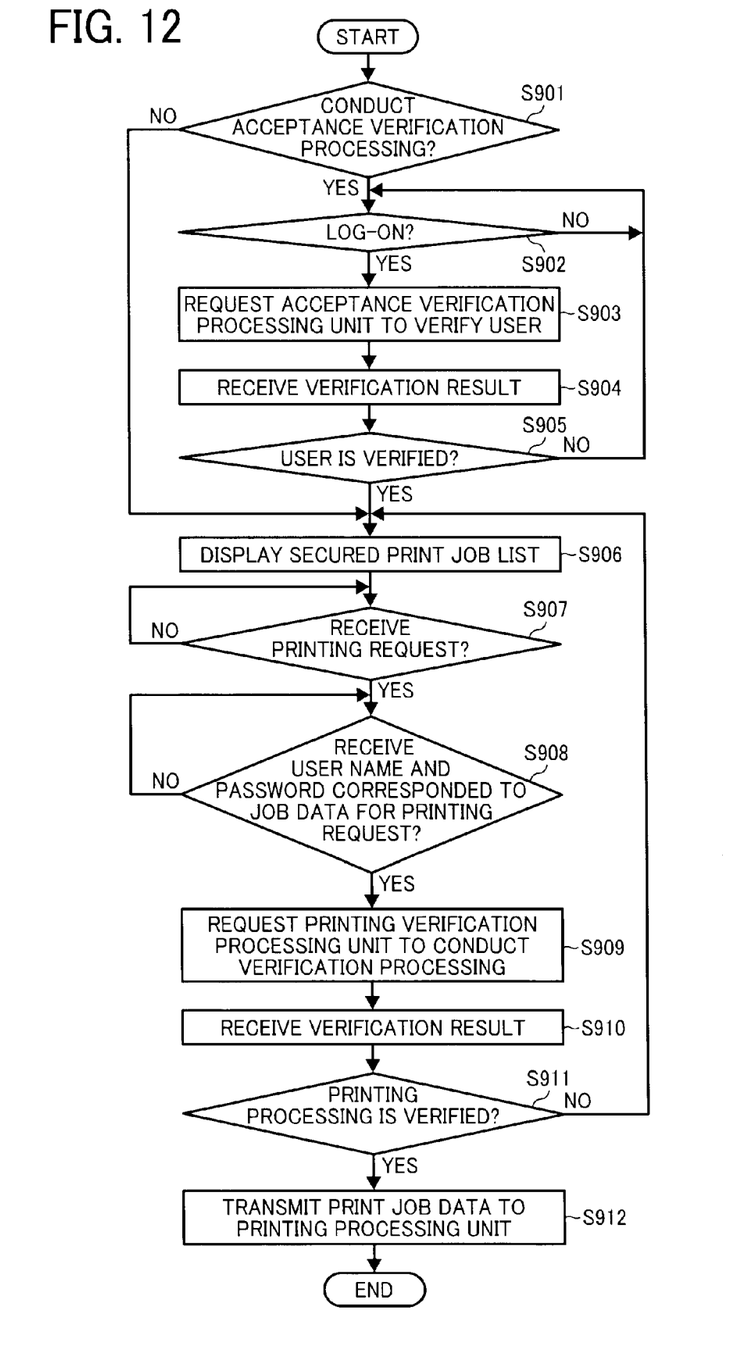
FIG. 12 illustrates a flowchart for processes conductable using an operation panel processing unit.

A description is given to processes in the operation panel processing unit 602 with reference to FIG. 12, which illustrates a flowchart for processes conductable by using the operation panel processing unit 602. As illustrated in FIG. 12, the operation panel processing unit 602 may determine whether a job acceptance verification function is conducted (step S901). In step S901, it is determined whether the acceptance verification mode storage 603 stores information that a job acceptance verification processing is to be conducted.

If it is determined that the job acceptance verification function is to be conducted at step S901 (step S901: YES), the operation panel processing unit 602 may be set in a waiting mode until a user logs-on, which may be referred to as "NO" loop (step S902: NO loop). For example, at step S902, the operation panel processing unit 602 may wait until a user inputs the user name C and password C.

When the user logs-on at step S902 (step S902: YES), the operation panel processing unit 602 requests an job acceptance verification processing to the verification processing unit 606 (step S903). At step S903, the operation panel processing unit 602 requests the verification processing unit 606 to check the user name C and password C received at step S902. The verification processing unit 606 determines whether account information stored in the account information storage 604 includes a set of user name and password that can be matched to the set of user name C and password C. If it is determined that the user name and password matched to the set of user name C and password C exists in the account information storage 604, the verification processing unit 606 reports a verification result that verification has succeeded to the operation panel processing unit 602. If it is determined that the user name and password matched to the set of user name C and password C does not exist in the account information storage 604, the verification processing unit 606 reports a verification result that verification has not succeeded (or has failed) to the operation panel processing unit 602.

As such, the operation panel processing unit 602 receives the verification result from the verification processing unit 606 (step S904). Based on the verification result, the operation panel processing unit 602 determines whether the user that logs-on at step S902 is verified as authentic user (step S905). If the user is not verified at step S905 (step S905: NO), the process returns to step S902. Then, another job acceptance verification processing may be conducted repeatedly.

If the user is verified at step S905 (step S905: YES), the operation panel processing unit 602 reads out a secured print job list from the secured print job storage 605, and displays the secured print job list (step S906). Further, if it is determined that the job acceptance verification function is not conducted at step S901 (step S901: NO), the process goes to step S906, and the subsequent steps are to be conducted.

Then, the operation panel processing unit 602 waits until the operation panel processing unit 602 receives a printing request from the user (step S907: NO loop). When the operation panel processing unit 602 receives the printing request at step S907 (step S907: YES), the operation panel processing unit 602 waits to receive a user name and a password corresponding to the received printing request for the print job data (step S908).

When the operation panel processing unit 602 receives the user name and password such as user name C and password C at step S908 (step S908: YES), the operation panel processing unit 602 requests the printing verification processing unit 607 to conduct a verification processing of the user name and password (step S909). At step S909, the operation panel processing unit 602 requests the printing verification processing unit 607 to check the user name C and password C received at step S908. At step S909, the printing verification processing unit 607 determines whether the user name B and password B attached to the secured print job matches the user name C and password C received at step S908. If it is determined that the user name B/password B matches the user name C/password C, the verification processing unit 606 reports a verification result that verification has succeeded to the operation panel processing unit 602. If it is determined that the user name B/password B does not match the user name C/password C, the verification processing unit 606 reports a verification result that verification has not succeeded (or has failed) to the operation panel processing unit 602.

As such, the operation panel processing unit 602 receives the verification result from the printing verification processing unit 607 (step S910). Based on the verification result, the operation panel processing unit 602 determines whether the printing processing is verified for the secured print job (step S911). At step S911, when the printing processing is not verified (step S911: NO), the process returns to step S906. Then, another job acceptance verification processing may be conducted repeatedly.

If the printing processing for the secured print job is verified at step S911 (step S911: YES), the operation panel processing unit 602 transmits the secured print job to the printing processing unit 608 (step S912), wherein such secured print job is requested by the printing request at step S907. When the printing processing unit 608 receives the print job data from the operation panel processing unit 602, the printing processing unit 608 conducts a printing operation for the print job data.

In the flowchart of FIG. 12, if a user name/password logged-on at step S902 is identical to a user name/password used for the secured print job, which has received a printing request at step S907, following steps S908 to step S911 can be omitted.

As above described, in a print processing system according to an example embodiment, one set of user name and password can be used to conduct a secured printing function and a job acceptance verification processing function at the same time.

Further, even if a client/server configuration is employed for the print processing system (e.g., the UI module 301 is set in a client apparatus whereas the graphic module 302 is set in a server), a secured printing function can be conducted because the user name A and password A used for the secured printing function can be stored in the registry 315 (see FIG. 6), which can be accessed or readable by the graphic module 302 as above described.

As above described, a job acceptance verification function and a secured printing function can be conducted seamlessly using one verification information using a print processing system, a printing processing method, a printing processing program, and a storage medium according to an example embodiment.

In the above described example embodiments, a computer-readable medium storing a program for processing print job in a print processing system is devised. The program includes instructions that when executed by a computer cause the computer to execute a method of processing print job in the print processing system having a terminal apparatus to prepare a print job based on a document file prepared by using an application and a printing apparatus communicably connected to the terminal apparatus to conduct a printing process for the print job. The method includes the steps of receiving, controlling, reading out, attaching, transmitting, and controlling. The receiving step receives verification information to be attached to the print job using the terminal apparatus. The controlling step controls a storage destination for storing the verification information received at the receiving step using the terminal apparatus. The reading out step reads out the verification information from the storage destination using the terminal apparatus. The attaching step attaches the read-out verification information to the print job using the terminal apparatus. The transmitting step transmits the print job, to which the verification information is attached, from the terminal apparatus to the printing apparatus. The controlling step controls at least one of job acceptance verification processing and secured printing processing using the printing apparatus by using the verification information received by the terminal apparatus in the receiving step and attached to the print job by the terminal apparatus in the attaching step.

In the above-described exemplary embodiments, a computer can be used with a computer-readable program to control functional units used for a printing processing system, apparatus, and printing processing method. For example, a particular computer (e.g., personal computer, work station) may control the printing processing system or apparatus using a computer-readable program, which can execute the above-described processes or steps. Further, in the above-described exemplary embodiments, a storage device (or recording medium), which can store computer-readable program, may be a flexible disk, a compact disk read only memory (CD-ROM), a digital versatile disk read only memory (DVD-ROM), DVD recording only/rewritable (DVD-R/RW), a memory card, a memory chip, a mini disk (MD), a magneto optical disc (MO), magnetic tape, hard disk such in a server, or the like, but not limited these. Further, a computer-readable program can be downloaded to a particular computer (e.g., personal computer) via a network such as the Internet, or a computer-readable program can be installed to a particular computer from the above-mentioned storage device, by which the particular computer may be used for the printing processing system or apparatus according to exemplary embodiments, for example.

The above described print processing system, printing processing method, printing processing program and storage medium can be preferably used for a printer system that a terminal apparatus and a printer are connected using a network, and for printer system employing a client/server configuration, for example, but not limited thereto.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. A terminal apparatus for preparing a print job based on a document file prepared using an application and transmitting the print job to a printing apparatus, the terminal apparatus comprising:
    a verification-use information receiving unit to receive verification information to be attached to the print job;
    a storage destination control unit to control a storage destination of the verification information received by the verification-use information receiving unit;
    an information retrieval and attachment unit to read out the verification information from the storage destination and to attach the read-out verification information to the print job; and
    a data transmission unit to transmit the print job, to which the verification information is attached by the information retrieval and attachment unit, to the printing apparatus,
    wherein:
    the storage destination includes a storage region readable by the information retrieval and attachment unit, and a print ticket includable in the document file, and
    the storage destination control unit stores the verification information concurrently in the storage region readable by the information retrieval and attachment unit, and in the print ticket includable in the document file.

2. The terminal apparatus according to claim 1, further comprising a function designation unit usable to designate at least one of job acceptance verification processing and secured printing processing of the print job,
    wherein the information retrieval and attachment unit attaches the verification information read out from the storage region to the print job as verification information for job acceptance verification processing.

3. The terminal apparatus according to claim 1, further comprising a function designation unit usable to designate at least one of job acceptance verification processing and secured printing processing of the print job,
    wherein the information retrieval and attachment unit attaches the verification information read out from the print ticket to the print job as verification information for secured printing processing.

4. The terminal apparatus according to claim 1, wherein the storage region is a registry.

5. A print processing system, comprising:
    a terminal apparatus to prepare a print job based on a document file prepared using an application; and
    a printing apparatus communicably connected to the terminal apparatus for conducting a printing process for the print job,
    the terminal apparatus including:
    a verification-use information receiving unit to receive verification information to be attached to the print job;
    a storage destination control unit to control a storage destination for the verification information received by the verification-use information receiving unit;
    an information retrieval and attachment unit to read out the verification information from the storage destination and to attach the read-out verification information to the print job; and
    a data transmission unit to transmit the print job, to which the verification information is attached by the information retrieval and attachment unit, to the printing apparatus,
    the printing apparatus including:
    a job receiving unit to receive the print job from the data transmission unit of terminal apparatus; and
    a processing control unit to control at least one of job acceptance verification processing and secured printing processing by using the verification information attached to the print job by the information retrieval and attachment unit and received by the job receiving unit,
    wherein:

the storage destination includes a storage region readable by the information retrieval and attachment unit, and a print ticket includable in the document file, and the storage destination control unit storing the verification information concurrently to the storage region readable by the information retrieval and attachment unit, and in the print ticket includable in the document file.

6. The print processing system according to claim 5, wherein the terminal apparatus further includes a function designation unit usable to designate at least one of job acceptance verification processing and secured printing processing for the print job, wherein the information retrieval and attachment unit attaches the verification information read out from the storage region to the print job as verification information for job acceptance verification processing, the processing control unit controls the job acceptance verification processing based on the verification information for job acceptance verification processing attached to the print job.

7. The print processing system according to claim 5, wherein the terminal apparatus further includes a function designation unit usable to designate at least one of job acceptance verification processing and secured printing processing for the print job, wherein the information retrieval and attachment unit attaches the verification information read out from the print ticket to the print job as verification information for secured printing processing, the processing control unit controls the secured printing processing based on the verification information for secured printing processing attached to the print job.

8. The print processing system according to claim 5, wherein the storage region is a registry.

9. A method of processing print job in a print processing system having a terminal apparatus to prepare a print job based on a document file prepared by using an application and a printing apparatus communicably connected to the terminal apparatus to conduct a printing process for the print job, the method comprising the steps of:

receiving verification information to be attached to the print job using the terminal apparatus;

controlling a storage destination for storing the verification information received at the receiving step using the terminal apparatus;

reading out the verification information from the storage destination using the terminal apparatus;

attaching the read-out verification information to the print job using the terminal apparatus;

transmitting the print job, to which the verification information is attached, from the terminal apparatus to the printing apparatus; and controlling at least one of job acceptance verification processing and secured printing processing using the printing apparatus by using the verification information received by the terminal apparatus in the receiving step and attached to the print job by the terminal apparatus in the attaching step, wherein the storage destination includes a storage region accessed in the attaching step and a print ticket includable in the document file, and the verification information is able to be stored concurrently in the storage region and in the print ticket includable in the document file.

10. The method according to claim 9, further comprising the step of designating at least one of job acceptance verification processing and secured printing processing for the print job, wherein the attaching step attaches the verification information read out from the storage region to the print job as verification information for job acceptance verification processing, the job acceptance verification processing is controlled based on the verification information for job acceptance verification processing attached to the print job.

11. The method according to claim 9, further comprising the step of designating at least one of job acceptance verification processing and secured printing processing for the print job, wherein the attaching step attaches the verification information read out from the print ticket to the print job as verification information for secured printing processing, the secured printing processing is controlled based on the verification information for secured printing processing attached to the print job.

12. The method according to claim 9, wherein the storage region is a registry.

* * * * *